May 21, 1935.
R. K. LEE
2,002,269
MOTOR MOUNTING
Original Filed Feb. 24, 1930
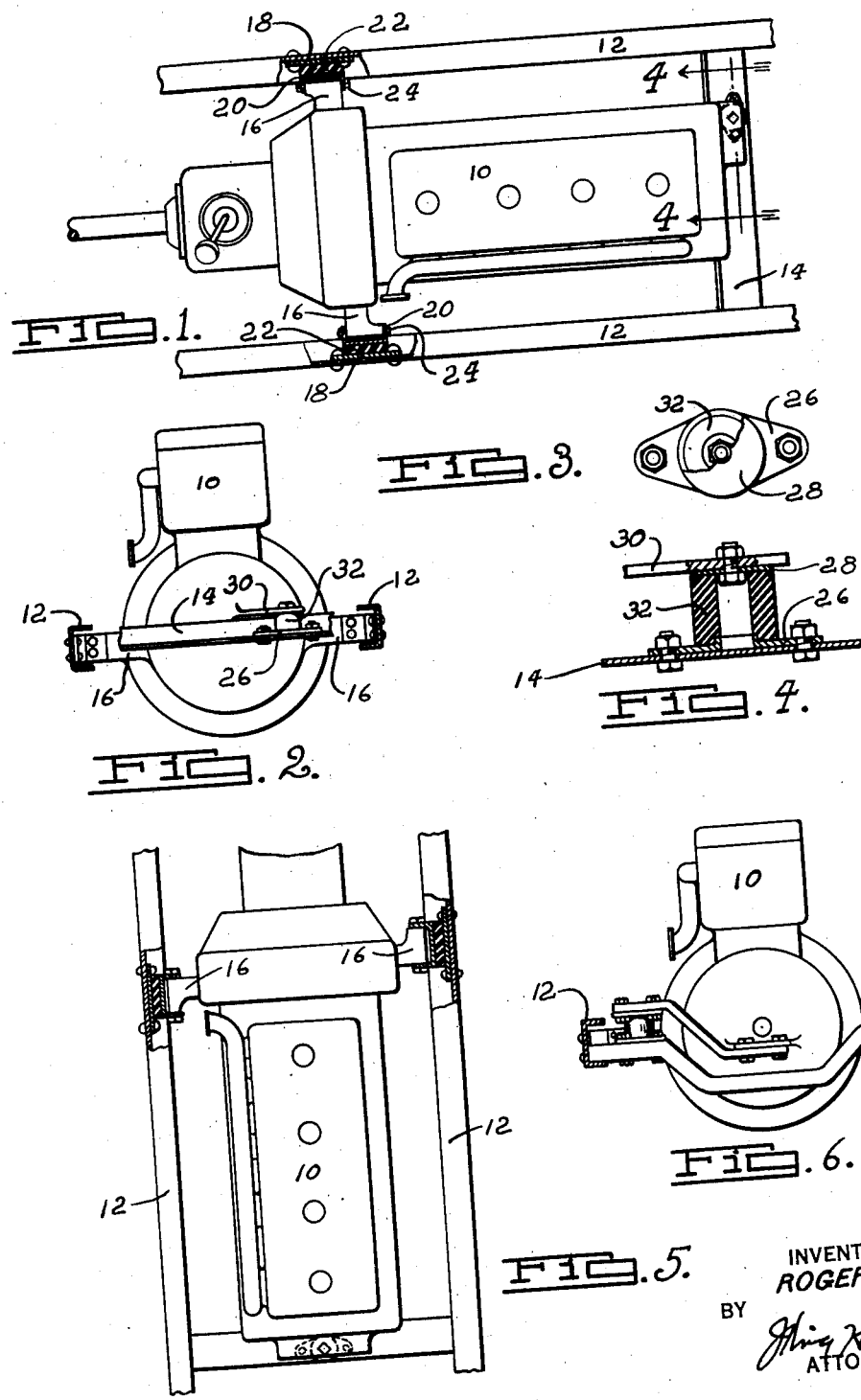
INVENTOR
ROGER K. LEE.
BY
ATTORNEY Patented May 21, 1935

2,002,269

UNITED STATES PATENT OFFICE 2,002,269

MOTOR MOUNTING

Roger K. Lee, Highland Park, Mich., assignor to Chrysler Corporation, Detroit, Mich., a corporation of Delaware Application February 24, 1930, Serial No. 430,631
Renewed March 20, 1933

7 Claims. (Cl. 248—14.2)

This invention relates to the mounting of an internal combustion engine on a support and more particularly to the resilient mounting of an internal combustion engine in the chassis frame of an automobile.

An important object of the invention is to arrange the mounting between the engine and its support in such a manner to prevent building up of synchronism in torque reaction produced by the motor. More specifically stated, the invention consists in mis-aligning the supports for the engine.

Other objects and advantages of the invention will more fully appear from the following description taken in connection with the accompanying drawing, in which:

Fig. 1 is a plan view showing an internal combustion engine mounted in a chassis frame, parts being broken away and in section.

Fig. 2 is a front end view of Fig. 1, the side frame members being shown in section.

Fig. 3 is a plan view of the front mounting between the engine and chassis.

Fig. 4 is a sectional view on line 4—4 of Fig. 1.

Fig. 5 is a plan view of an internal combustion engine mounted in a chassis frame showing a modification of my invention, parts being broken away and in section.

Fig. 6 is a front end view of the motor showing a modified form of the front end mounting.

Referring to the illustrated embodiment of my invention, I have shown an internal combustion engine 10 mounted between parallel side frame members 12 of an automobile chassis. A cross member is shown at 14 and the engine is supported at its forward end on the cross member 14 and on the side frame members at its rear end.

The crank shaft of an internal combustion engine rotates in a clock-wise direction and the resultant forces of this rotation cause the engine block to transmit a force in a counter clockwise direction. This force is hereinafter referred to as the torque re-action of an internal combustion engine, which is in a counter clock-wise direction.

As a means for dampening the torque re-actions, I have provided laterally extending arms 16 on the rear portion of the engine 10 and have arranged a resilient mounting between the ends of the arms 16 and the side frame members 12. Heretofore these mountings have been in alignment and on a line perpendicular to the axis of the engine. In the form of my invention shown in Fig. 1, I have arranged the mountings at the rear end of the engine, one in advance of the other so that they are mis-aligned. The mounting on the torque side of the engine is preferably in advance of the mounting on the opposite side of the engine.

The particular type of mounting which I have selected for illustrating the invention is provided with a plate like member 18, adapted to be secured to the frame 12, and a plate like member 20, secured to the motor arm 12, spaced from the plate like member 18. A rubber member 22 has its opposite faces vulcanized to the adjacent faces of the plate like members 18 and 20. The mounting, which is a single unit consisting of the plates 18 and 20 and the rubber 22, is detachably secured to the motor arm 16 by bolts 24.

At the forward end of the engine I have provided another resilient mounting consisting of a bottom plate member 26 adapted to be secured to the cross member 14, an upper plate member 28 adapted to be secured to a projection 30 on the engine 10 and a cylindrical block of rubber 32 having its opposite ends vulcanized to the adjacent faces of the plates 26 and 28. I have arranged this front end mounting at one side of the axis of the engine, preferably on the side opposite to the torque side of the engine.

Referring to a modified form of my invention shown in Fig. 5, the front mounting is shown on the longitudinal axis of the engine with the rear mountings in transverse mis-alignment. If desired, the mounting at the forward end of the engine may be offset with relation to the axis of the engine on the torque side of the engine, as shown in Fig. 6, and that the rear end supports may or may not be in transverse alignment.

It will be understood that the arrangement of the three supports may or may not be mis-aligned in relation to the longitudinal and transverse axes of the engine. For example, the rear supports may be mis-aligned in relation to the transverse axis of the engine with the front support on the longitudinal axis of the engine or the front support may be offset from the longitudinal axis of the engine with the rear support mis-aligned or in transverse alignment.

Various changes, including the size, shape and arrangement of parts, may be made without departing from the spirit of my invention and it is my intention to cover by my claims such changes as may be reasonably included within the scope thereof.

I claim:

1. A mounting of the class described comprising, an internal combustion engine, a support including side frame members and a cross member, a front engine connection between said engine and said cross member, and lateral connections at the rear of said engine between said engine and said side frame members, one of said lateral connections being in advance of the other of said lateral connections.

2. A mounting of the class described comprising, an internal combustion engine, a support including side frame members and a cross member, a front engine connection between said engine and said cross member, and resilient lateral connections at the rear of said engine between said engine and said side frame members, one of said lateral connections being in advance of the other of said lateral connections.

3. A mounting of the class described comprising, an internal combustion engine, a support including side frame members and a front cross member, a single front engine connection between said engine and said support, said connection being arranged at one side of the center of gravity of the engine between side frame members, and lateral connections between said engine and said side frame members.

4. A mounting of the class described comprising, an internal combustion engine, a support including side frame members and a front cross member, a single front engine connection between said engine and said cross member, said connection being arranged at one side of the longitudinal center of the engine between said side frame members, and lateral connections between said engine and said side frame members, one of said lateral connections being in advance of the other of said lateral connections.

5. The combination of an internal combustion engine unit, laterally spaced resilient mounting members interposed between said unit and said supporting structure adjacent one transverse plane of said unit, and a single resilient mounting member spaced longitudinally from said laterally spaced mounting members and located between the central vertical plane of said unit and one side of said supporting structure and so constructed and arranged as to sustain, in conjunction with only one of said laterally spaced mounting members, the major portion of the weight of said unit, the other of said laterally spaced mounting members being relieved of the major portion of the weight of said unit so as to condition it for opposing oscillatory movement of the unit and predetermining the natural frequency of such oscillatory movement at a comparatively low value.

6. The combination of an internal combustion engine unit, laterally spaced resilient rear mounting members interposed between said unit and said supporting structure, and a resilient front mounting member located between the central vertical plane of said unit and one side of said supporting structure and so constructed and arranged as to sustain, in conjunction with only one of said rear mounting members, the major portion of the weight of said unit, the other rear mounting member being relieved of the major portion of the weight of said unit so as to condition it for opposing oscillatory movement of the unit and predetermining the natural frequency of such oscillatory movement at a selected comparatively low value.

7. The combination of an internal combustion engine unit, laterally spaced resilient rear mounting members, one interposed between each side of said engine and the corresponding side of said supporting structure respectively, and a resilient front mounting member coacting between said frame structure and said engine unit at a location adjacent the lateral extremity of said unit on the torque side thereof and so constructed and arranged as to sustain, in conjunction with the rear mounting member on the opposite side of said unit, the major portion of the weight of the latter, the other of said rear mounting members being relieved of the major portion of the weight of said unit so as to condition it for opposing oscillatory movement of the unit and predetermining the natural frequency of such oscillatory movement at a comparatively low value.

ROGER K. LEE.